Aug. 21, 1956     D. D. BALLEW     2,759,436
DOUGHNUT FORMER AND CUTTING MECHANISM

Filed June 12, 1953     2 Sheets-Sheet 1

INVENTOR.
DALLAS D. BALLEW

BY Howard J. Whelan
ATTORNEY.

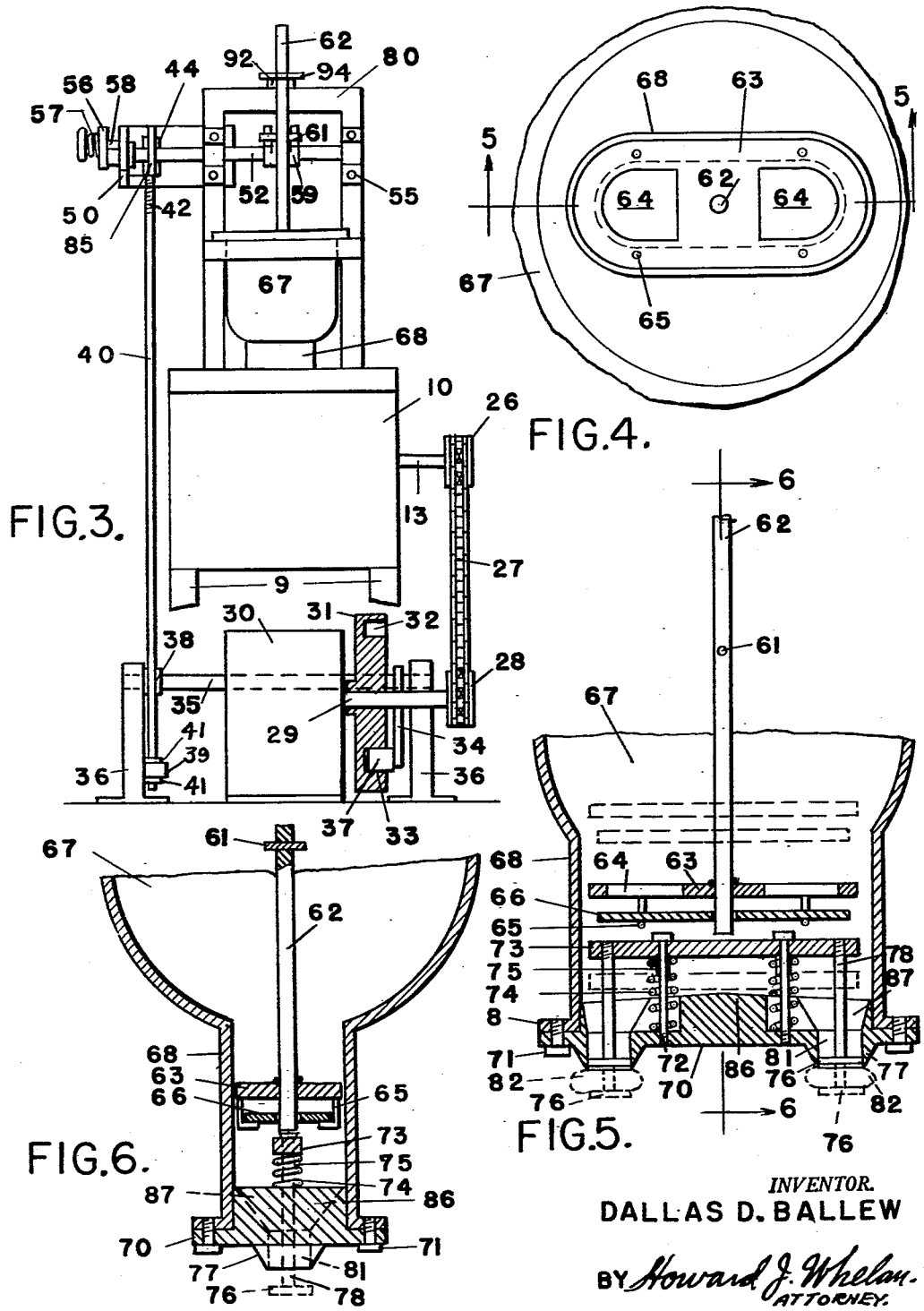

United States Patent Office 2,759,436
Patented Aug. 21, 1956

2,759,436

DOUGHNUT FORMER AND CUTTING MECHANISM

Dallas D. Ballew, Baltimore, Md.

Application June 12, 1953, Serial No. 361,283

6 Claims. (Cl. 107—14)

This invention relates to improvements in machines for feeding batches of dough or the like to cutters used for cutting annular formations of dough, such as doughnuts and the like.

It is therefore an object of this invention to provide a new and improved automatic dough cutter in which accurately measured quantities of dough can be repeatedly formed into doughnuts and severed from the mass of dough.

Another object of this invention is to provide a new and improved dough feeder, former and cutter mechanism irrespective of the details of construction of the frying mechanism and other related parts.

Another object of this invention is to provide a new and improved adjustable dough feeding, measuring and severing device which may be applied to any type of doughnut machine.

A still further object of this invention resides in providing a hopper having a downwardly projecting throat constructed with a plurality of valve mechanisms for controlling the entry of the dough into the throat and other valve mechanisms for controlling the extrusion of the dough from the throat and in further providing a single operating member for alternately feeding a plurality of measured amounts of dough while travelling in one direction and forming the doughnuts and cutting them off from the dough in the hopper while the member is returning to its starting position.

Other objects of the invention will become apparent as the invention is more fully set forth.

For a better understanding of the invention and its objects reference is made to the accompanying drawings, which when used in conjunction with the following description outline a particular form of the invention by way of example, while the claims emphasize the scope thereof.

In the drawings:

Figure 3 is an end view of Figure 1 with a part in section;

Figure 4 is an enlarged plan view of the hopper showing the valve head;

Figure 5 is a sectional view taken on line 5—5 of Figure 4; and

Figure 6 is a sectional view taken on line 6—6 of Figure 5.

Similar reference characters refer to similar parts throughout the drawings.

Figure 1:
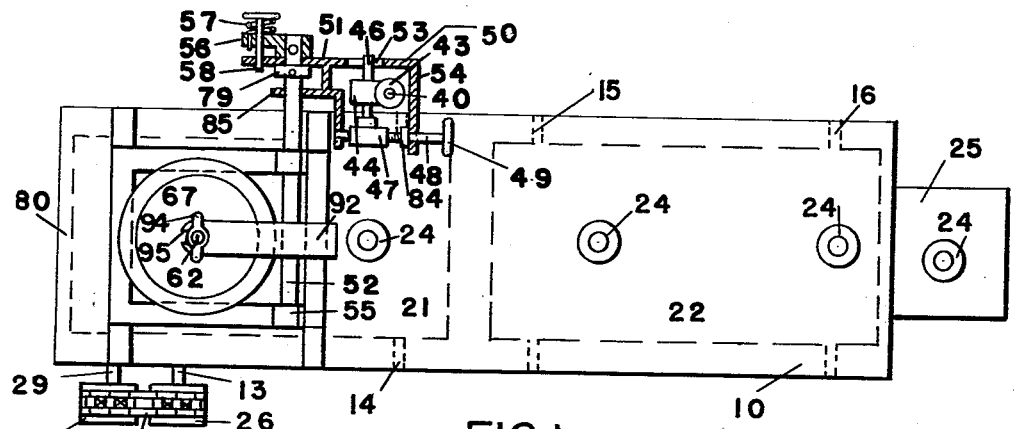
Figure 1 is a plan view with parts in section of an improved doughnut former and cutting mechanism embodying this invention.
Figure 2:
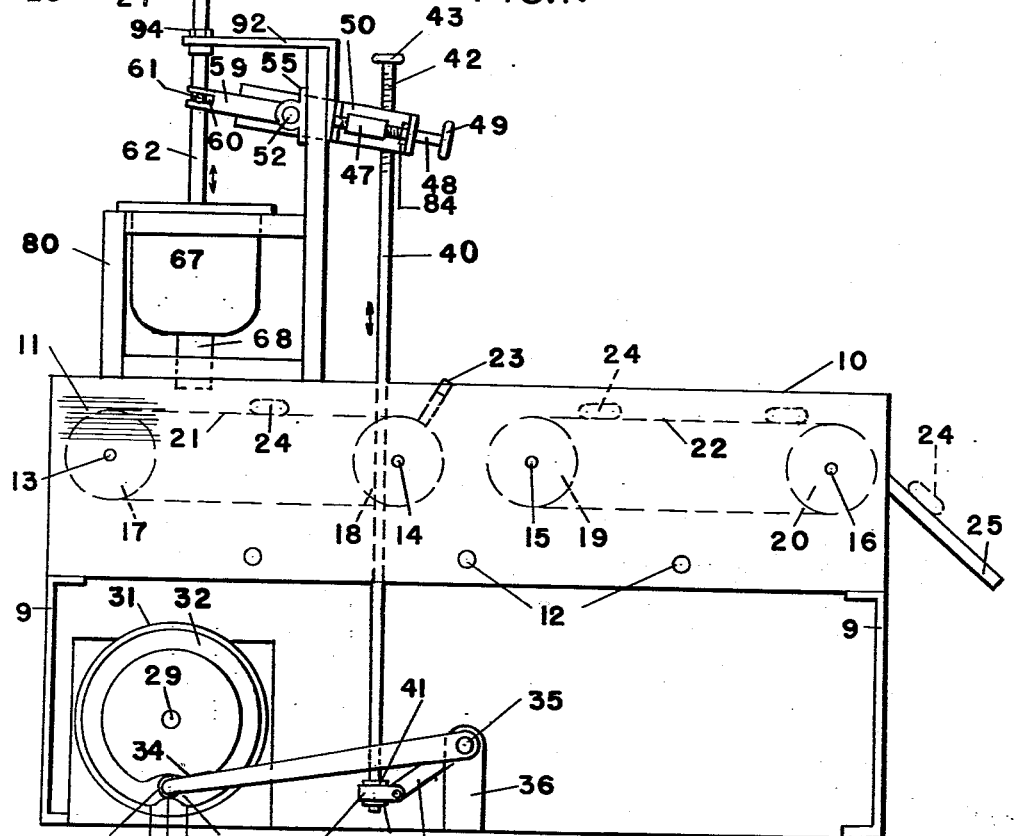
Figure 2 is a side elevation of Figure 1.

The doughnut machine with which the invention is illustrated, comprises a frying cabinet 10 of conventional design, having end and side walls for holding the frying fat 11. Elements 12 are positioned in the cabinet to heat the frying medium 11. Shafts 13, 14, 15 and 16 are mounted in bearings attached to the cabinet 10 and support sprockets 17, 18, 19 and 20, for carrying chain conveyors 21 and 22. The conveyor 21 is provided with paddles 23 to receive the doughnuts 24 as they are dropped from the hopper and carry them forward while cooking one side of the doughnut, they are then turned over and deposited on the conveyor 22 to complete the cooking of the opposite side of the doughnut, then slid down the chute 25 to the outside for cooling. The shaft 13 is driven by a sprocket gear 26 and chain 27 connected to a sprocket gear 28 mounted on one end of a motor shaft 29 driven by motor 30. Also mounted on the motor shaft 29 is a cam 31 provided with a circular slot 32 that terminates in an irregular or quick acting slot 33. A rocker arm 34 mounted on a shaft 35 is supported in bearings 36 and is oscillated by a roller 37 operating in slots 32 and 33 of cam 31. The shaft 35 operates an arm 38 and its pivoted end 39 to move a feed arm 40 up and down when actuated by the cam 31 at predetermined intervals. The feed arm 40 is provided with a pair of washers 41 to allow the arm 40 to be rotated by a handwheel 43 and still be in engagement with the pivoted end 39. The upper end of the arm 40 is provided with threads 42 and adjustably positioned in the threaded portion of the fitting 44 to regulate the thickness of the doughnut. The fitting 44 is provided with a pin 46 having one end threaded to fit into the side of an adjusting bracket 47 and tightened. The end of the bracket 47 is threaded to receive an adjuster screw 48 used to move the bracket 47 back and forth when rotated by a handwheel 49 to control the diameter of the doughnut. A support 50 having a side wall 51 is loosely mounted on a shaft 52 and held by a collar 79 and is provided with an elongated slot 53 to guide and support the unthreaded end of the pin 46. It also has an end 54 bent at right angles to the side wall 51 and is provided with a hole to receive the adjuster screw 48 that is held therein by a collar 84. A coupling 56 is affixed to the end of the shaft 52 and provided with a spring 57 to normally hold a pin 58 in engagement with the side wall 51 of the support 50, and is used to transmit the reciprocating movement of the feed arm 40 to the shaft 52 and rod 62. An arm 85 is attached to the side wall 51 of the support 50 and supports the end of the adjusting screw 48 and bracket 47. The arm 85 is provided with a hole to fit loosely over shaft 52, and prevents the support from binding on the shaft 52. The shaft 52 supports and operates a bifurcated bracket 59 having an elongated slot 60 in each of its ends to receive a pin 61 positioned in rod 62 and moves it up and down through an adjustable collar 94 affixed in a support 92. The support 92 has a slot 95 in its end to receive the adjustable collar 94.

The lower end of the rod 62 is affixed to a valve head 63 having passages 64 therethrough and fitted with guide members 65 to limit the travel of the valve plate 66 that closes the passages 64 at predetermined intervals. A hopper 67 is mounted on a stand 80 attached to the cabinet 10 and is provided with neck-like portion 68 having its end 8 flanged to act as a support for the forming and shearing die 70 that is affixed thereto by bolts 71. The forming and shearing die 70 is fitted with two long stems 72 that act as guides and travel limiters, for the cutter supporting plate 73 that is tensioned upward by springs 74. Hollow sleeves 75 are affixed to the cutter supporting plate 73 and guide and align the cutters 76 with the flanged openings 77, 81 in the die 70. The cutters 76 are connected to the supporting plate 73 by supports 78. The upper part 86 of the forming and shearing die 70 is formed with funnel shaped portions 87 to guide the dough 82 from the hopper through the openings 81 to be formed and cut from the dough in the hopper. The upper part 86 is finished to fit snugly in the neck portion 68 of the hopper 67.

In the operation of the device, the ready mixed dough is placed in the hopper 67, the handwheel 43 is rotated to produce a doughnut of predetermined thickness and the handwheel 49 is rotated to produce a doughnut of predetermined diameter. The motor 30 is started, the pin 58 is engaged in wall 51, the cam 31 is rotated and the roller 37 travels in the circular slot 32 and when the roller 37 travels from "A" to "B" the rod 62 is pushed down, forcing the cutters 76 out of the opening 81 so the dough can project therefrom until 37 is lowered in the quick acting slot 33 from "B" to "C" and raises the cutters 76 into the opening 81 and severs the doughnut, through the action of the springs 74, when the rod 62 is raised. During the movement of the cam 31 and roller 37 between points "C" to "A" the rod 62 remains stationary at the upward end of its stroke. This causes the dough 82 to flow down through the passages 64. As the rod 62 and valve head 63 travel in a downward direction it forces the valve plate 66 against the valve head 63 closing the passages 64 and forcing the dough 82 through the funnels 87 and out of the openings 81 in the forming and shearing die 70.

As the rod 62 travels downward, its lower end contacts the cutter supporting plate 73 forcing the cutters 76 downwardly and out of the openings 81, causing the dough to flow out around the cutters 76 as shown in dotted outline 82 in Figure 5. When the rod 62 returns to its upper position, the cutters 76 travel upwardly and form a hole in the doughnut and separate it from the rest of the dough in the neck portion 68 of the hopper, allowing the cut and formed doughnut to drop onto the conveyor 21 and paddles 23 and be carried through the cabinet and fryed on one side, then turned over and deposited on conveyor 22 and fryed on the other side. It is then transferred to a chute 25 where it travels outside to cool. The operation is then repeated for each pair of doughnuts produced.

While but one general form of the invention is shown in the drawings and described in the specification, it is not desired to limit this application for patent to this particular form as it is appreciated that other forms of construction could be made that would use the same principles and come within the scope of the appended claims.

Having thus described the invention, what is claimed is:

1. A machine for forming and dispensing doughnuts in dough form, comprising a support, a hopper mounted thereon, said hopper having a hollow neck portion, a normally open valve means mounted within said neck for periodically stopping the flow of dough into said neck, forming and shearing die means mounted at the outlet end of said neck beneath said valve means, said die means including a forming and shearing die having spaced circular openings therethrough, a cutter supporting plate positioned above said die, compression spring means for supporting said plate above said die, guide stems attached to said die and slidably mounted in said plate, cutters slidably mounted in each of said openings, each of said cutters being attached in fixed relationship to said plate by supports and forcing means operating in said neck to urge said plate against said die so as to move said cutters out of said openings and to close said valve means.

2. A machine as set forth in claim 1 wherein the forcing means consists of a rod extending through the hopper and means for intermittently reciprocating said rod to contact the plate and to recede therefrom.

3. A machine as set forth in claim 1 said openings being funnel-shaped, with the tapering extending toward the outlet.

4. A machine as set forth in claim 2 said valve means including an apertured valve head secured to the bottom of the rod in the hopper, and a valve plate attached to and having a lost-motion connection with said valve head, to control the amount of dough passing through the valve head.

5. A machine as set forth in claim 4 including adjusting means operably connected with said rod to control the thickness and to control the diameter of the dough exuding through the openings.

6. A machine as set forth in claim 2, the means for intermittently reciprocating the rod consisting of a motor driven element having a circular curve therein, a link having one end driven in said curve and its other end connected to said rod, said curve allowing a dwell of the rod and having an upturned portion to oscillate the link and reciprocate the rod.

References Cited in the file of this patent
UNITED STATES PATENTS

| 1,345,500 | Mitchell | July 6, 1920 |
| 1,484,179 | McClure et al. | Feb. 19, 1924 |
| 1,506,232 | Fleming | Aug. 26, 1924 |
| 1,823,146 | Hunter | Sept. 15, 1931 |
| 2,637,282 | Belshaw et al. | May 5, 1953 |